US 10,072,205 B2

(12) United States Patent
Reyes et al.

(10) Patent No.: US 10,072,205 B2
(45) Date of Patent: Sep. 11, 2018

(54) METHODS AND SYSTEMS FOR ACIDIZING SUBTERRANEAN FORMATIONS WITH TREATMENT FLUIDS CONTAINING DUAL-FUNCTIONING CHELATING AGENTS

(71) Applicant: Halliburton Energy Services, Inc., Houston, TX (US)

(72) Inventors: Enrique Antonio Reyes, Houston, TX (US); Alyssa Lynn Smith, Houston, TX (US); Aaron M. Beuterbaugh, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 230 days.

(21) Appl. No.: 13/925,888

(22) Filed: Jun. 25, 2013

(65) Prior Publication Data

US 2014/0374107 A1    Dec. 25, 2014

(51) Int. Cl.
*C09K 13/04* (2006.01)
*C09K 8/72* (2006.01)
(Continued)

(52) U.S. Cl.
CPC ............ *C09K 8/72* (2013.01); *C09K 8/74* (2013.01); *E21B 43/283* (2013.01)

(58) Field of Classification Search
CPC .................. C09K 13/04; E21B 43/283
(Continued)

(56) References Cited

U.S. PATENT DOCUMENTS

2008/0139412 A1  6/2008  Fuller
2009/0042748 A1  2/2009  Fuller
(Continued)

FOREIGN PATENT DOCUMENTS

WO   2012/171858 A1   12/2012
WO   2014209649 A1    12/2014

OTHER PUBLICATIONS

Internatiional Search Report and Written Opinion for PCT/US2014/042479 dated Oct. 27, 2014.
(Continued)

*Primary Examiner* — Zakiya W Bates
*Assistant Examiner* — Ashish K Varma
(74) *Attorney, Agent, or Firm* — McDermott Will & Emery LLP

(57) ABSTRACT

When used outside the pH range at which metal ion complexation normally occurs, aminopolycarboxylic acids can moderate the reaction rate of acids with carbonate minerals. Methods for treating a subterranean formation can comprise: providing a treatment fluid comprising an aqueous carrier fluid, an acid, and a chelating agent comprising an aminopolycarboxylic acid, the treatment fluid having a pH below that at which the carboxylic acid groups of the chelating agent are substantially protonated and the chelating agent is ineffective for complexing a metal ion; introducing the treatment fluid into a subterranean formation comprising a carbonate mineral; reacting the acid with the carbonate mineral, such that the acid at least partially spends and the pH of the treatment fluid rises; and once the pH of the treatment fluid rises above a $pK_a$ value for one or more of the carboxylic acid groups, complexing a metal ion with the chelating agent.

18 Claims, 7 Drawing Sheets

(51) Int. Cl.
*E21B 43/28* (2006.01)
*C09K 8/74* (2006.01)

(58) Field of Classification Search
USPC .......................................................... 166/307
See application file for complete search history.

(56) References Cited

U.S. PATENT DOCUMENTS

| | | | |
|---|---|---|---|
| 2010/0276152 A1* | 11/2010 | De Wolf | C09K 8/74 166/308.2 |
| 2012/0067576 A1 | 3/2012 | Reyes et al. | |
| 2012/0097392 A1* | 4/2012 | Reyes | C02F 5/12 166/279 |
| 2012/0115759 A1 | 5/2012 | Reyes | |
| 2014/0342953 A1 | 11/2014 | Reyes et al. | |
| 2015/0211345 A1 | 7/2015 | Reyes et al. | |

OTHER PUBLICATIONS

De Wolf et al., "Evaluation of Environmentally Friendly Chelating Agents for Applications in the Oil and Gas Industry," Society of Petroleum Engineers, SPE International Symposium and Exhibition on Formation Damage Control held in Layfayette, LA, Feb. 2014.

Hyvonen et al., "Complexation of 3-hydroxy-2,2-iminodisuccinic Acid (HIDS) with $Mg^{2+}$, $Ca^{2+}$, $Mn^{2+}$, $Fe^{3+}$, $Fe^{2+}$, $Co^{2+}$, $Ni^{2+}$, $Cu^{2+}$, and $Zn^{2+}$ Ions in Aqueous Solution," Journal of Coordination Chemistry, 2010, pp. 2-13-2025, vol. 63, No. 12.

Mahmoud et al., "An Effective Stimulation Fluid for Deep Carbonate Reservoirs: A Core Flood Study," Society of Petroleum Engineers, SPE 131626, CPS/SPE International Oil & Gas Conference and Exhibition in China, 2010.

Mahmoud et al., "Stimulation of Carbonate Reservoirs Using GLDA (Chelating Agent) Solutions," Society of Petroleum Engineers, SPE 132286, Trinidad and Tobago Energy/Resources Conference held in Port of Spain, Trinidad, 2010.

Pinto et al., "Biodegradable Chelating Agents for Industrial, Domestic and Agricultural Applications—A Review," Environ Sci Pollut Res, 2014, pp. 11893-11906, vol. 21, No. 11.

Rahman et al., "Hydroxyiminodisuccinic Acid (IHIDS): A Novel Biodegradable Chelating Ligand for the Increase of Iron Bioavailability and Arsenic Phytoextraction," Chemosphere, 2009, pp. 207-213, vol. 77.

* cited by examiner

METHODS AND SYSTEMS FOR ACIDIZING SUBTERRANEAN FORMATIONS WITH TREATMENT FLUIDS CONTAINING DUAL-FUNCTIONING CHELATING AGENTS

BACKGROUND

The present disclosure generally relates to acidizing subterranean formations, and, more specifically, to methods for acidizing subterranean formations in the presence of a chelating agent that is initially unable to complex a metal ion.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Acidizing operations may be used to stimulate a subterranean formation to increase production of a hydrocarbon resource therefrom. Introduction of the acidizing fluid to the subterranean formation may take place at matrix flow rates without fracturing of the formation matrix, or at higher injection rates and pressures to fracture the formation (i.e., an acid-fracturing operation). During an acidizing operation, an acid-soluble material in the subterranean formation can be dissolved by one or more acids to expand existing flow pathways in the subterranean formation, to create new flow pathways in the subterranean formation, and/or to remove acid-soluble precipitation damage in the subterranean formation. The acid-soluble material being dissolved by the acid(s) can be part of or formed from the native formation matrix or can have been deliberately introduced into the subterranean formation in conjunction with a stimulation or like treatment operation (e.g., proppant or gravel particulates). Illustrative substances within the native formation matrix that may be dissolved by an acid include, but are not limited to, carbonates, silicates and aluminosilicates. Other substances can also be dissolved during the course of performing an acidizing operation, and the foregoing substances should not be considered to limit the scope of substances that may undergo acidization.

Carbonate formations can contain minerals that comprise a carbonate anion (e.g., calcite (calcium carbonate) and dolomite (calcium magnesium carbonate)). When acidizing a carbonate formation, the acidity of the treatment fluid alone can be sufficient to solubilize the carbonate material by decomposing the carbonate anion to carbon dioxide and leeching a metal ion into the treatment fluid. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. As used herein, the term "siliceous" refers to a substance having the characteristics of silica, including silicates and/or aluminosilicates. Dissolution of siliceous materials through acidization is thought to be considerably different than acidizing carbonate materials, since the mineral and organic acids that can be effective for acidizing carbonate materials may have little effect on a siliceous materials. In contrast, hydrofluoric acid, another mineral acid, can react very readily with siliceous materials to promote their dissolution. Oftentimes, a mineral acid or an organic acid can be used in conjunction with hydrofluoric acid to maintain a low pH state as the hydrofluoric acid becomes spent during dissolution of a siliceous material. In addition to siliceous materials, many types of siliceous formations can also contain varying amounts of carbonate materials. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite).

In some instances, it can be desirable to remove a carbonate material from a siliceous formation prior to acidizing the siliceous material therein. A leading reason to remove a carbonate material separately from a siliceous material is that calcium ions liberated from the carbonate material can react readily with fluoride ions to form highly insoluble calcium fluoride, which can be more damaging to the subterranean formation than if the acidizing operation had not been performed in the first place. Another approach that can be used in this regard is to employ chelating agents that effectively sequester the liberated calcium ions, such that they are substantially unable to undergo a further reaction to produce calcium fluoride. Chelating agents can also be used with similar benefits in conjunction with acidizing a carbonate formation. Normally, when acidizing a subterranean formation of any type in the presence of a chelating agent, the pH of the acidizing fluid is maintained in a range where the chelating agent has a pair of free electrons that it can donate to form a metal-ligand bond. Otherwise, the chelating agent can be ineffective for undergoing metal ion complexation. For example, in the case of carboxylic acid-containing chelating agents, the carboxylic acid group normally needs to be deprotonated in order for effective complexation of a metal ion to take place. Certain metal ions can also be more effectively complexed within some pH ranges than in others.

When acidizing a carbonate formation with a mineral acid or an organic acid, and to a somewhat lesser extent a siliceous formation also containing a carbonate material therein, it can be desirable to increase the permeability of the formation through generation of wormholes in the formation matrix without increasing the skin value of the formation. As used herein, the term "skin value" refers to a quantitative measure of damage that is present in a subterranean formation. As used herein, the term "wormhole" refers to a channel generated in the matrix of a subterranean formation through dissolution of a material therein, particularly a carbonate material. During acidizing operations conducted at matrix flow rates (i.e., below the fracture gradient of a subterranean formation), wormhole generation can be desirable in order to increase the permeability of the subterranean formation. In many instances, however, the rapid reaction of acids with carbonate materials can result in bulk erosion of the formation matrix, rather than the desired generation of wormholes, and increased permeability may not be realized. In acid-fracturing operations, wormhole generation can sometimes be less desirable, since wormholes can divert an acid from a desired location and decrease the amount of acid etching that occurs in a generated fracture.

As noted above, bulk erosion of the formation matrix can be problematic during acidizing operations due to the rapid reaction of acids with carbonate materials. One technique that may be used to lower these reaction rates is to decrease the acid concentration, but this approach can result in the acidizing fluid becoming spent too quickly. Another approach that may be used to decrease reaction rates is to viscosify the acidizing fluid. Suitable viscosifed acidizing fluids that may be used in this regard include, for example, acid-stable emulsions, gelled fluids based on acrylamide polymers, viscoelastic fluids based on sulfonated acrylamide polymers, and viscosified fluids containing non-polymeric viscoelastic surfactants. However, these approaches can considerably add to the cost and complexity needed to effectively conduct an acidizing operation. Moreover, the viscosifying agents have the potential to damage the subterranean formation.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
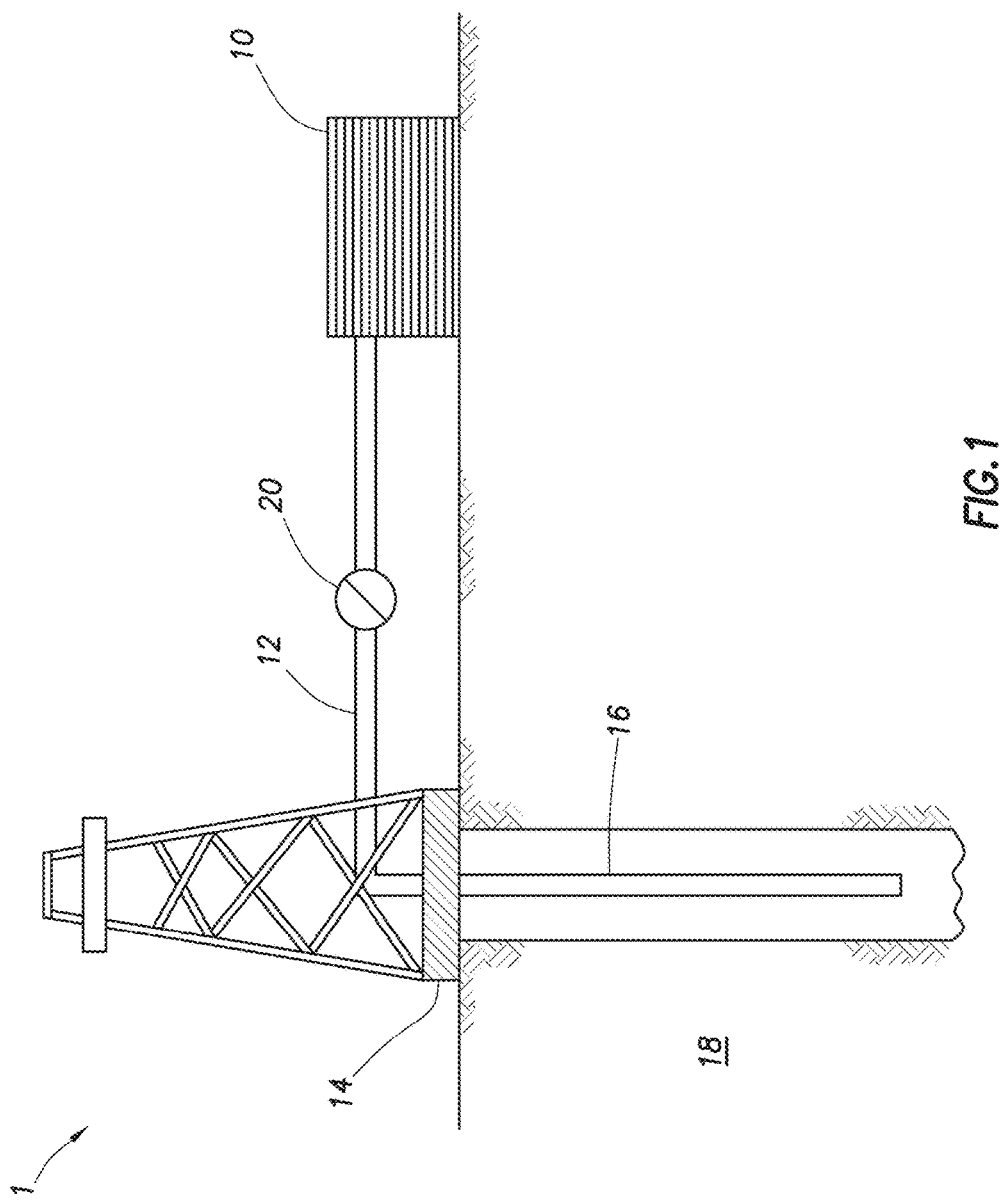
FIG. 1 shows an illustrative schematic of a system that can deliver treatment fluids of the present invention to a downhole location.

The present disclosure generally relates to acidizing subterranean formations, and, more specifically, to methods for acidizing subterranean formations in the presence of a chelating agent that is initially unable to complex a metal ion.

As discussed above, chelating agents may be utilized in various acidizing operations or in other subterranean treatment operations to complex a metal ion and sequester it in the subterranean environment. When a metal ion is complexed by a suitable chelating agent, the metal ion may display a decreased propensity for forming a precipitate in a fluid phase. Complexation of a metal ion, such as a calcium ion, with a chelating agent may change the chemical form of the metal ion such that it does not readily undergo a reaction to form a precipitate and/or as the naked metal ion's solubility limit is surpassed. Thus, by employing a chelating agent, the risk of precipitation damage in a subterranean formation resulting from the presence of a metal ion may be decreased. Although precipitation of calcium fluoride or other insoluble metal salts can be a particular concern when acidizing a siliceous formation with hydrofluoric acid, particularly a siliceous formation that also contains a carbonate mineral, the production of calcium-containing precipitates can also be problematic when acidizing carbonate formations without using this acid. In this regard, production of calcium-containing precipitates may become more prevalent as the acid in an acidizing fluid becomes spent and its pH rises.

One of ordinary skill in the art will recognize that there are fairly well established pH ranges over which a chelating agent can be expected to effectively complex a metal ion. The pH range over which metal ion complexation may effectively take place can be dependent on a number of factors including, but not limited to, the chemical structure of the chelating agent, the functional groups present in the chelating agent, and the particular metal ion being complexed. Nevertheless, one of ordinary skill in the art will understand these issues and be able to determine if a particular metal ion is being effectively complexed by a given chelating agent. For example, in a chelating agent that contains carboxylic acid groups, complexation of a metal ion may occur when one or more of the carboxylic acid groups are in a deprotonated state. In contrast, when the carboxylic acid groups are substantially protonated (e.g., when the chelating agent is present in a treatment fluid with a pH below the $pK_a$ values of the carboxylic acid groups), there may not be an available electron pair on the chelating agent to form a metal-ligand bond with a metal ion. Accordingly, when chelating agents have typically been used in treatment fluids, the pH values of the treatment fluids have been chosen to be in a range that is effective for metal ion complexation to take place. Ordinarily, there is no motivation to work outside this effective pH range.

The present inventors discovered that chelating agents may be able to deliver surprising benefits during acidizing operations, even when employed at pH values that are outside those over which the chelating agents are normally effective for complexing a metal ion. More specifically, the inventors discovered that by employing aminopolycarboxylic acid chelating agents in acidizing operations at pH values below those over which metal ion complexation usually takes place, the rate of carbonate dissolution could desirably be decreased. Although it can sometimes be desirable to increase the rate of dissolution in an acidizing operation, when an acidizing operation's goal is to generate wormholes, a decreased rate of dissolution may be more desirable. The decreased rate of dissolution at more acidic pH values in the presence of aminopolycarboxylic acid chelating agents was completely unexpected, as increased acidity would normally be expected to produce a faster dissolution rate. As alluded to above, when the pH of an aminopolycarboxylic acid chelating agent is below the effective pH range, dissolution of a carbonate material is typically promoted only by the acid. In contrast, when working within the effective pH range, both acid-promoted dissolution and ligand-promoted dissolution of the carbonate material may take place.

Once the chelating agent has slowed the initial rate of acidizing, the chelating agent may remain present in the subterranean formation undergoing treatment. As the acidizing operation progresses and the acidizing fluid becomes spent, the pH can rise. At this stage, the initially inactive chelating agent can once again become operable for complexing a metal ion in the subterranean formation. For example, the chelating agent can complex a metal ion liberated from a carbonate mineral (e.g., a calcium ion) through an initial acid-promoted dissolution. However, in contrast to typical procedures in which a chelating agent is employed, where acid-promoted dissolution and ligand-promoted dissolution are operating substantially simultaneously, the complexation effect is believed to be delayed in the embodiments described herein. Hence, in the embodiments described herein, chelating agents may play a dual role of slowing dissolution rates and performing a delayed metal complexation reaction. These dual roles are significantly different than those played by these compounds in typical acidizing operations. Although the metal ion complexation response is delayed in the embodiments described herein, in most cases, complexation begins to take effect within a pH realm where it is more often needed, rather than in a low pH range where solubility can be higher.

In addition to the advantages described above, utilization of chelating agents in the manner described herein can have still further benefits during an acidizing operation. One benefit is that the number of treatment stages conducted during an acidizing operation may be decreased by using a single, low pH treatment fluid comprising a chelating agent. Moreover, although the embodiments described herein are believed to be most beneficial for use in conjunction with acidizing a carbonate formation, related benefits may also be realized when removing a carbonate material from a predominantly siliceous formation. In this regard, the treatment fluids described herein may be used to dissolve a carbonate material in a siliceous formation during a first acidizing stage, such that calcium ions are removed from the formation before acidizing of a siliceous material takes place with hydrofluoric acid in a second acidizing stage, thereby decreasing the risk of calcium fluoride precipitation.

As a further benefit of the treatment fluids and acidizing techniques described herein, many aminopolycarboxylic acid chelating agents are biodegradable. The ability to use biodegradable chelating agents during a treatment operation can significantly limit its environmental impact. A further discussion of biodegradable chelating agents follows hereinbelow.

Moreover, as an additional benefit of aminopolycarboxylic acid chelating agents, these compounds generally possess good solubilities in aqueous fluids, even when their carboxylic acid groups are substantially protonated. Many other types of chelating agents, in contrast, often display limited solubilities at low pH values, particularly at pH values below about 2 where their carboxylic acid groups are substantially protonated. Working within a soluble pH range is not usually an operational hindrance with most chelating agents in conventional acidizing operations, since this pH range oftentimes overlaps with the pH range over which the chelating agents are most effective for complexing a metal ion. However, it is believed that the limited solubilities of many conventional chelating agents may be problematic for the embodiments described herein, in which the pH of a treatment fluid is below that at which the chelating agent is effective for complexing a metal ion. Hence, aminopolycarboxylic acid chelating agents can be further advantageous in this regard as well.

In some embodiments, the treatment fluids and methods described herein can be utilized in matrix acidizing operations. That is, in some embodiments, the treatment fluids described herein can be introduced to a subterranean formation below a fracture gradient pressure of the subterranean formation. In such embodiments, the interaction of the treatment fluid with the formation matrix may result in the desirable formation of wormholes therein. In other embodiments, the treatment fluids described herein can be introduced to a subterranean formation at or above a fracture gradient pressure of the subterranean formation, such that one or more fractures are created or enhanced in the subterranean formation. Given the benefit of the present disclosure and the understanding of one having ordinary skill in the art, one can readily determine whether to introduce the treatment fluids to a subterranean formation at matrix flow rates (i.e., below the fracture gradient pressure) or at fracturing flow rates (i.e., at or above the fracture gradient pressure).

In some embodiments, methods described herein can comprise: providing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion; introducing the treatment fluid into a subterranean formation comprising a carbonate mineral; reacting the acid with the carbonate mineral in the presence of the chelating agent, such that the acid at least partially spends and the pH of the treatment fluid rises; and once the pH of the treatment fluid rises above a $pK_a$ value for one or more of the carboxylic acid groups, complexing a metal ion with the chelating agent. In some embodiments, a chelating agent having substantially protonated carboxylic acid groups has no deprotonated carboxylic acid functionalities.

In some embodiments, the treatment fluid may be introduced to the subterranean formation below a fracture gradient of the subterranean formation. At such introduction pressures, the treatment fluid may form wormholes in the carbonate mineral in some embodiments, or result in bulk erosion of the carbonate mineral in other embodiments. One of ordinary skill in the art will recognize the circumstances under which wormhole generation or bulk surface erosion is more desirable. In some embodiments, reacting the acid with the carbonate mineral in the presence of the chelating agent may comprise interacting the acid with the carbonate mineral in a manner to form one or more wormholes therein.

In other embodiments, the treatment fluid may be introduced to the subterranean formation at a pressure at or above a fracture gradient of the subterranean formation. Although wormhole generation is not as likely in such embodiments, the other features and advantages of the methods described herein may still be realized.

In some embodiments, methods described herein may comprise: providing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion; introducing the treatment fluid into a subterranean formation comprising a carbonate mineral, the treatment fluid being introduced into the subterranean formation at a pressure greater than or equal to a fracture gradient of the subterranean formation, so as to form a fractured formation; reacting the acid with the carbonate mineral in the fractured formation such that the acid at least partially spends and the pH of the treatment fluid rises; and once the pH of the treatment fluid rises above a $pK_a$ value for one or more of the carboxylic acid groups, complexing a metal ion with the chelating agent.

In various embodiments, the treatment fluids described herein can comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine a suitable aqueous carrier fluid for utilization in the embodiments described herein.

In various embodiments, the treatment fluids described herein can have a pH that is below the $pK_a$ values of the carboxylic acid groups comprising the aminopolycarboxylic acid chelating agent. Further disclosure regarding suitable aminopolycarboxylic acid chelating agents follows below. GLDA (glutamic acid diacetic acid), for instance, has a $pK_a$ value of about 2.6 for its most acidic carboxylic acid group. Below a pH value of about 2.6, GLDA is fully protonated and believed to be inactive for complexing a metal ion. MGDA (methylglycine diacetic acid), in contrast, has a $pK_a$ value in the range of about 1.5-1.6 for its most acidic carboxylic acid group, and it only becomes fully protonated and inactive for complexing a metal ion nearly a full pH unit below GLDA. One of ordinary skill in the art will recognize that other aminopolycarboxylic acid chelating agents may exhibit similar variance in the acidity of their carboxylic acid groups. Given the benefit of this understanding, one of ordinary skill in the art will be able to choose a suitable pH realm for a treatment fluid in order to place a chelating agent therein in a state where it is ineffective for complexing a metal ion. Further factors that may be taken into account in determining a suitable pH for a treatment fluid include, for example, the composition of the subterranean formation and the desired acidizing rate. In various embodiments, the treatment fluids described herein can have a pH value of about 3 or lower, or about 2.5 or lower, or about 2 or lower, or about 1.5 or lower, or about 1 or lower. In some embodiments, the pH of the treatment fluids may range between about 3 and about 0, or between about 2.5 and about 0, or between about 2 and about 0, or between about 1.5 and about 0, or between about 1 and about 0.

In some embodiments, the treatment fluids described herein may include an acid. Acid-generating compounds may also be used in the treatment fluids in a substantially equivalent manner. The acid or acid-generating compound may be a mineral acid, an organic acid or any combination thereof. In some embodiments, a suitable acid can be hydrochloric acid, or hydrochloric acid in combination with an organic acid. Hydrobromic acid alone or in combination with an organic acid may also be used. Organic acids may also be used in place of a mineral acid. Suitable organic acids may include, for example, formic acid, acetic acid, chloroacetic acid, dichloroacetic acid, trichloroacetic acid, methanesulfonic acid and the like. Examples of suitable acid-generating compounds that may be used in some embodiments described herein include, for example, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

In various embodiments, the treatment fluids described herein may be substantially free of hydrofluoric acid or a hydrofluoric acid-generating compound. As used herein, a treatment fluid will be considered to be substantially free of hydrofluoric acid or a hydrofluoric acid-generating compound if there is less than about 0.5% hydrofluoric acid or generatable hydrofluoric acid present by weight. In other embodiments, the treatment fluids may be free of hydrofluoric acid or a hydrofluoric acid-generating compound altogether. Hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), and various boron trifluoride complexes. As discussed above, hydrofluoric acid may be used to dissolve a siliceous material in a subterranean formation. Although some embodiments of the treatment fluids described herein may be substantially free of hydrofluoric acid or a hydrofluoric acid-generating compound, they may still be used to treat a siliceous formation in some cases. For example, in some embodiments, a substantially hydrofluoric acid-free treatment fluid may be used to remove a carbonate mineral that is present in a siliceous formation. That is, in some embodiments, the subterranean formation into which the treatment fluid is introduced may further comprise a siliceous mineral in addition to a carbonate mineral. Thereafter, at least a portion of the siliceous mineral in the subterranean formation may be removed in a separate acidizing stage with a treatment fluid comprising hydrofluoric acid or a hydrofluoric acid-generating compound. A chelating agent may also be present in the treatment fluid that comprises the hydrofluoric acid or hydrofluoric acid-generating compound, as described, for example, in commonly owned United States Patent Application Publications 20120067576 and 20120097392, each of which is incorporated herein by reference in its entirety. Illustrative siliceous materials that may be removed from a subterranean formation following removal of a carbonate mineral can include silicates and aluminosilicates such as, for example, silica, quartz, sandstone, clays, feldspars, and the like.

In various embodiments, an amount of the acid or acid-generating compound present in the treatment fluid can be sufficient to produce a pH value at which the chelating agent is ineffective for complexing a metal ion. When the acid comprises a mineral acid such as hydrochloric acid, for example, the acid may be initially present in the treatment fluid in an amount ranging between about 1% to about 10% of the treatment fluid by weight, or in an amount ranging between about 5% to about 10% of the treatment fluid by weight. Since organic acids are generally less acidic than are mineral acids, when the treatment fluid comprises an organic acid, the organic acid may comprise up to about 20% of the treatment fluid by weight, particularly between about 1% to about 20% of the treatment fluid by weight, or between about 10% to about 20% of the treatment fluid by weight.

In more particular embodiments, the treatment fluid may initially contain hydrochloric acid in an amount ranging between about 1% to about 10% of the treatment fluid by weight, or between about 1% to about 5% of the treatment fluid by weight, or between about 5% to about 10% of the treatment fluid by weight. In some or other embodiments, the treatment fluid may initially contain greater than about 1% hydrochloric acid by weight, or greater than about 5% hydrochloric acid by weight.

In some embodiments, the treatment fluids may comprise an aqueous carrier fluid; an acid selected from the group consisting of hydrochloric acid, hydrobromic acid, formic acid, acetic acid, methanesulfonic acid, and any combination thereof; and a chelating agent comprising an aminopolycarboxylic acid; where the treatment fluid is substantially free of hydrofluoric acid or a hydrofluoric acid-generating compound, and the treatment fluid has a pH at or below that at which the carboxylic acid groups of the chelating agent are substantially protonated and the chelating agent is ineffective for complexing a metal ion. In some embodiments, the treatment fluid may initially contain about 1% to about 10% hydrochloric acid by weight.

In various embodiments, the treatment fluids described herein can introduced to a subterranean formation that comprises a carbonate mineral such as, for example, calcite (calcium carbonate), dolomite (calcium magnesium carbonate), iron carbonate, or any combination thereof. As alluded to above, in some embodiments, the carbonate mineral may be the predominant component of the subterranean formation (i.e., the subterranean formation may comprise a carbonate formation), or the carbonate mineral may be co-present with other minerals such as, for example, siliceous minerals, including those noted above. Illustrative carbonate formations that may be acidized using the treatment fluids and methods described herein include, for example, limestone and chalk formations. Chalk formations are to be distinguished from other types of carbonate formations due to their high porosity, but generally low permeability values. Specifically, chalk formations can be highly porous, but the pores may lack interconnectivity, such that the chalk formation exhibits low apparent permeability values (e.g., about 10 mD or below) until acidized to form wormholes or like permeability-increasing modifications therein.

The temperature of the subterranean formation into which the treatment fluid is introduced is likewise not believed to be particularly limited. In some embodiments, the subterranean formation may have a temperature of about 100° F. or above, or about 150° F. or above, or about 200° F. or above, or about 250° F. or above, or about 300° F. or above. As will be recognized by one having ordinary skill in the art, as the temperature of the subterranean formation increases, the reaction rate of the acid with a carbonate material in the subterranean formation may also increase. One of ordinary skill in the art will further recognize that rapid reaction rates in higher temperature subterranean formations can make it difficult to generate wormholes therein in a reliable manner. However, by using a treatment fluid in accordance with some of the present embodiments, wormholes may be generated in a subterranean formation by introducing the treatment fluid below a fracture gradient pressure of the subterranean formation. That is, in some embodiments, reacting the acid in the treatment fluid with the carbonate mineral may comprise interacting the acid with the carbonate mineral in a manner to form one or more wormholes therein. In alternative embodiments, one or more fractures may be created or extended in the subterranean formation by introducing the treatment fluid to the subterranean formation at a pressure that is at or above the fracture gradient. One of ordinary skill in the art will understand how to measure the fracture gradient of a subterranean formation and how to introduce a treatment fluid to a subterranean formation above or below this pressure.

In various embodiments, the methods described herein may comprise complexing a metal ion with the chelating agent, once the pH of the treatment fluid rises and the chelating agent again becomes active for complexing a metal ion in the subterranean formation. The metal ion being complexed by the chelating agent is not believed to be particularly limited. Illustrative sources of the metal ion may include, for example, a native carbonate mineral present in the subterranean formation, a non-native carbonate material that was previously introduced to the subterranean formation, and/or metal ions being leached into the subterranean formation through corrosion of a drilling tool or wellbore pipe, for example. Illustrative metal ions that may be present in a subterranean formation due to dissolution of a carbonate mineral include, for example, calcium ions and magnesium ions. Illustrative metal ions that may be present in a subterranean formation due to corrosion include iron ions, or any other metal ion resulting from the dissolution of steel by an acid. In various embodiments, the metal ion being complexed by the chelating agent may include, for example, a calcium ion, a magnesium ion, an iron ion, or any combination thereof. The metal ion may be complexed with the chelating agent through a direct reaction of the chelating agent with a surface in the subterranean formation (i.e., a carbonate mineral surface), or the metal ion may be complexed by the chelating agent after the metal ion has undergone an initial dissolution by the acid.

A number of aminopolycarboxylic acids may be suitable for use as the chelating agent in the treatment fluids and methods described herein. A number of these aminopolycarboxylic acid chelating agents may be biodegradable. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. In this regard, suitable aminopolycarboxylic acid chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof. Particularly suitable biodegradable chelating agents that may be used in the treatment fluids described herein include, for example, MGDA, GLDA, EDDS, β-ADA, IDS, TCA6, BCA3, BCA5, BCA6, MCBA3, and MCBA5.

In some embodiments, as an alternative to aminopolycarboxylic acid chelating agents, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, or the like may be included in the treatment fluids described herein.

In some or other alternative embodiments, suitable chelating agents can include hydroxamates, as described in commonly owned U.S. patent application Ser. No. 13/663,825, filed on Oct. 30, 2012 and incorporated herein by reference in its entirety. In some or other alternative embodiments, suitable chelating agents can include pyridinecarboxylic acids, as described in commonly owned U.S. patent application Ser. No. 13/837,090, filed on Apr. 3, 2013 and incorporated herein by reference in its entirety.

In some embodiments, the chelating agent may comprise the neutral form of the chelating agent. In other embodiments, the chelating agent may comprise a salt form of the chelating agent, including an alkali metal salt of the chelating agent. Other salt forms of the chelating agent may also be used and include, for example, an ammonium salt form or a quaternary ammonium salt form, if available.

In various embodiments, the concentration of the chelating agent in the treatment fluid may range between about 0.1% to about 40% of the treatment fluid by weight. In some embodiments, the concentration of the chelating agent in the treatment fluid may range between about 0.1% to about 5% of the treatment fluid by weight, or between about 1% to about 10% of the treatment fluid by weight, or between about 5% to about 15% of the treatment fluid by weight, or between about 0.5% to about 5% of the treatment fluid by weight, or between about 10% to about 25% of the treatment fluid by weight, or between about 10% to about 40% of the treatment fluid by weight, or between about 30% to about 40% of the treatment fluid by weight.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

In various embodiments, systems configured for delivering the treatment fluids described herein to a downhole location are described. In various embodiments, the systems can comprise a pump fluidly coupled to a tubular, the tubular containing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

In various embodiments, the treatment fluids described herein may be used in conjunction with a stimulation operation conducted in a subterranean formation. The treatment fluids may be delivered downhole using the illustrative systems described hereinabove. In some embodiments, the stimulation operation can comprise a fracturing operation. In some or other embodiments, the stimulation operation can comprise an acidizing operation. In some embodiments, the treatment fluids described herein may be used in conjunction with a remediation operation conducted in a subterranean formation. Each of the foregoing treatment operations is discussed in more detail hereinbelow.

In some embodiments, the treatment fluids described herein may be used to treat a proppant pack or a gravel pack in a subterranean formation in order to increase its permeability. In some embodiments, the treatment fluids may be used to treat an existing fracture in a subterranean formation in order to enhance a flow pathway therein. In some embodiments, the treatment fluids may be used in the course of creating or extending a fracture in a subterranean formation by introducing the treatment fluid at or above a fracture gradient of the subterranean formation.

In some embodiments, the treatment fluids may be used to remediate a subterranean formation that has precipitation or accumulation damage therein. As used herein, the term "precipitation or accumulation damage" refers to a material that has been dissolved in a subterranean formation and deposited elsewhere within the subterranean formation, optionally after undergoing a further reaction. That is, the treatment fluids described herein may be used to dissolve the various components of such damage in order to increase the permeability of the subterranean formation, thereby leading to the possibility of increased production. The precipitation or accumulation damage in the subterranean formation may result from any source, which may include another stimulation operation.

In some embodiments, the treatment fluids described herein may be used in conjunction with drilling a wellbore penetrating a subterranean formation. For example, when used during drilling, the treatment fluids may desirably leave the subterranean formation conditioned with chelating agent so that precipitation can be subsequently mitigated at a later time. It is to be recognized, however, that the treatment fluids may also be used for proactive treatment of a subterranean formation at points in time other than in the drilling stage.

In some embodiments, the present disclosure provides methods comprising: providing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion; introducing the treatment fluid into a subterranean formation comprising a carbonate mineral; reacting the acid with the carbonate mineral in the presence of the chelating agent, such that the acid at least partially spends and the pH of the treatment fluid rises; and once the pH of the treatment fluid rises above a $pK_a$ value for one or more of the carboxylic acid groups, complexing a metal ion with the chelating agent.

In other embodiments, the present disclosure provides methods comprising: providing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion; introducing the treatment fluid into a subterranean formation comprising a carbonate mineral, the treatment fluid being introduced into the subterranean formation at a pressure greater than or equal to a fracture gradient of the subterranean formation, so as to form a fractured formation; reacting the acid with the carbonate mineral in the fractured formation, such that the acid at least partially spends and the pH of the treatment fluid rises; and once the pH of the treatment fluid rises above a $pK_a$ value for one or more of the carboxylic acid groups, complexing a metal ion with the chelating agent.

In still other embodiments, the present disclosure provides treatment fluids comprising: an aqueous carrier fluid; an acid selected from the group consisting of hydrochloric acid, hydrobromic acid, formic acid, acetic acid, methanesulfonic acid, and any combination thereof; and a chelating agent comprising an aminopolycarboxylic acid; wherein the treatment fluid is substantially free of hydrofluoric acid or a hydrofluoric acid-generating compound, and the treatment fluid has a pH at or below that at which the carboxylic acid groups of the chelating agent are substantially protonated and the chelating agent is ineffective for complexing a metal ion.

In still other embodiments, the present disclosure provides systems comprising: a pump fluidly coupled to a tubular, the tubular containing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion.

To facilitate a better understanding of the present invention, the following examples of preferred or representative embodiments are given. In no way should the following examples be read to limit, or to define, the scope of the invention.

EXAMPLES

Example 1

Solubility Testing of MGDA

Solubility testing of MGDA at various concentrations and pH values was carried out as set forth in Table 1. As can be seen, MGDA exhibited good solubility at fairly high concentrations.

TABLE 1

| MGDA Conc. (M) | pH | Solution Observations | | | |
|---|---|---|---|---|---|
| | | Day 1 | Day 2 | Day 8 | Day 30 |
| 0.5 | −0.5 | homogenous | homogenous | homogenous | homogenous |
| 0.5 | 0 | homogenous | homogenous | homogenous | homogenous |
| 0.5 | 0.5 | homogenous | homogenous | homogenous | homogenous |
| 0.5 | 1 | homogenous | homogenous | homogenous | homogenous |
| 0.5 | 1.5 | homogenous | homogenous | homogenous | homogenous |
| 0.5 | 2 | homogenous | homogenous | homogenous | homogenous |
| 0.75 | −0.5 | homogenous | homogenous | homogenous | homogenous |
| 0.75 | 0 | homogenous | homogenous | precipitation | precipitation |
| 0.75 | 0.5 | homogenous | homogenous | crystallization | precipitation |
| 0.75 | 1 | homogenous | homogenous | homogenous | homogenous |
| 0.75 | 1.5 | homogenous | homogenous | homogenous | homogenous |
| 0.75 | 2 | homogenous | homogenous | homogenous | homogenous |
| 1 | −0.5 | homogenous | homogenous | precipitation | precipitation |
| 1 | 0 | homogenous | slight precipitation | precipitation | precipitation |
| 1 | 0.5 | homogenous | homogenous | precipitation | precipitation |
| 1 | 1 | homogenous | homogenous | homogenous | precipitation |
| 1 | 1.5 | homogenous | homogenous | homogenous | precipitation |
| 1 | 2 | homogenous | homogenous | precipitation | precipitation |
| 1.25 | −0.5 | not tested | not tested | not tested | not tested |
| 1.25 | 0 | homogenous | homogenous | precipitation | precipitation |
| 1.25 | 0.5 | homogenous | homogenous | crystallization | precipitation |
| 1.25 | 1 | precipitation | precipitation | precipitation | precipitation |
| 1.25 | 1.5 | precipitation | precipitation | precipitation | precipitation |
| 1.25 | 2 | Slight precipitation | precipitation | precipitation | precipitation |

The solubility of MGDA was also measured in HCl by mixing 50 mL of a 38-41% MGDA solution with 45 mL of 36-38% HCl and diluting to 100 mL with water. During the addition of HCl, pH measurements were taken until a pH of about 1 was reached. Thereafter, the solution was stirred for 30 minutes before the remaining HCl was added. The final MGDA concentration was 26% by weight, and the final HCl concentration was 9% by weight. The MGDA remained soluble under these conditions for at least 12 hours.

For Examples 2-4 below, core flow tests were generally conducted by placing a core sample inside a Viton rubber sleeve and applying a radial confining pressure of 2000 psi. A back pressure of approximately 1000 psi was applied during treatment fluid introduction and eluent collection. During introduction, the treatment fluid was injected until the differential pressure matched that of the original pressure value, and thereafter, brine was generally flowed until the permeability stabilized. Eluent samples were collected periodically and analyzed for the presence of calcium by ICP-AES. The pH values of the eluent fractions were measured with a combination electrode probe that was calibrated daily against standard buffers (pH=1.68, 4 and 7).

Example 2

Treatment of a Calcite Core at 300° F. with 0.6 M MGDA at pH 1

Figure 2:
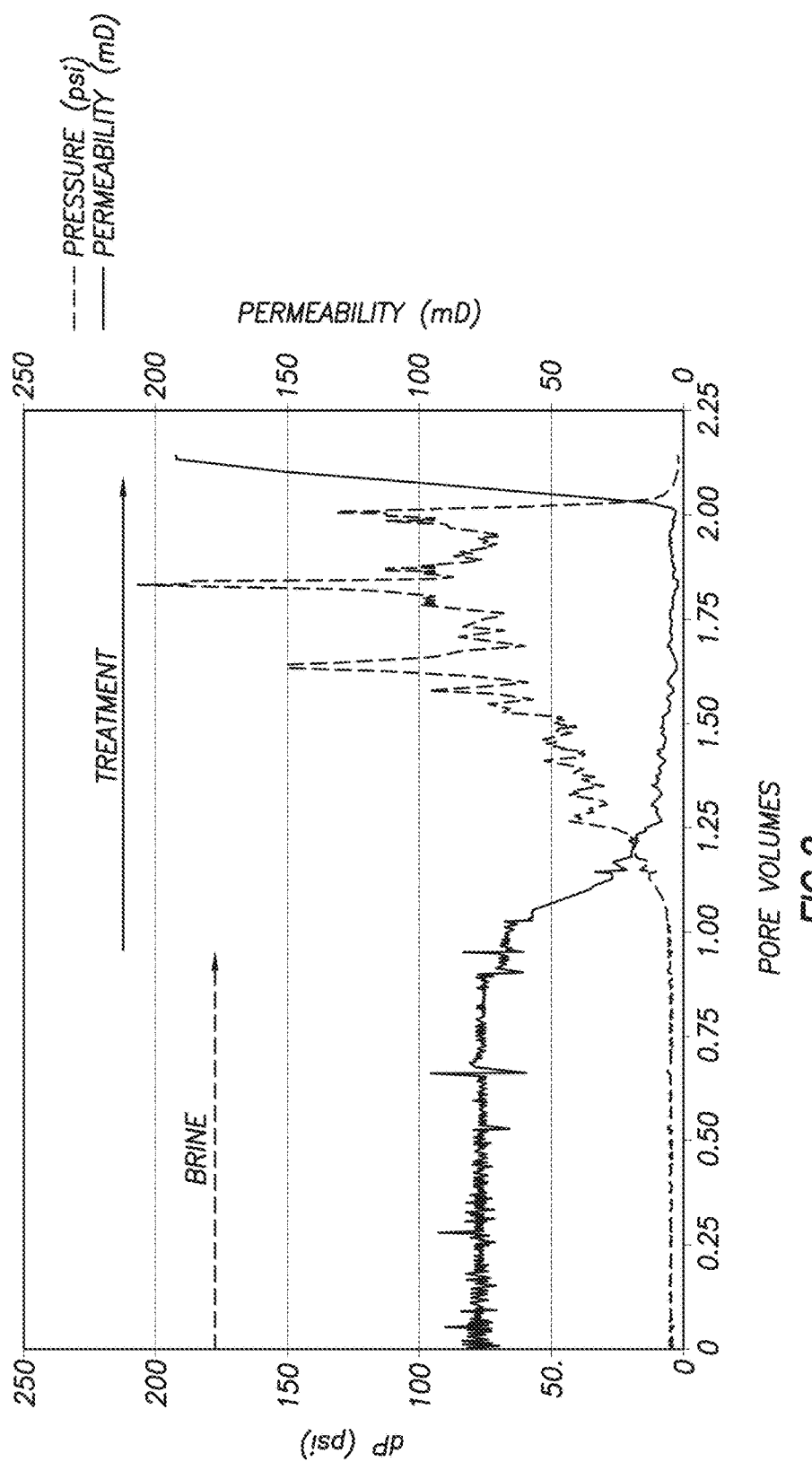
FIG. 2 shows an illustrative elution plot of a calcite core eluted at 300° F. with 0.6 M MGDA in water at pH 1.
Figure 3A:
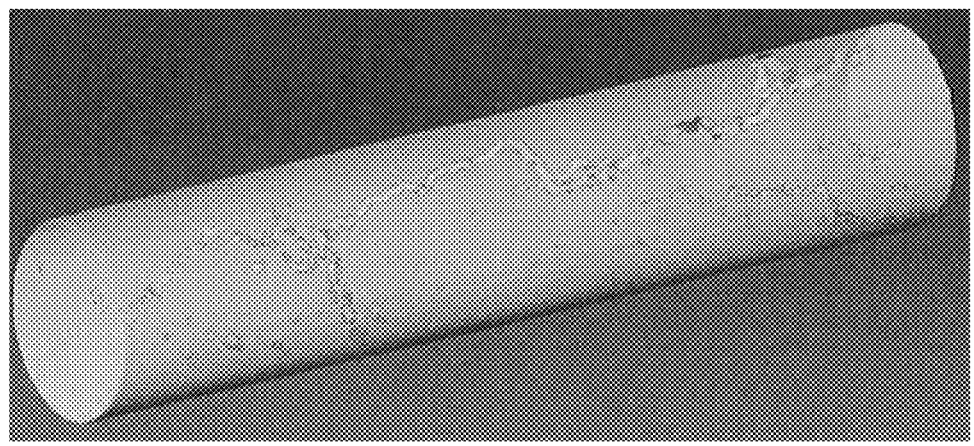
FIG. 3A shows a CAT scan image of an illustrative calcite core eluted at 300° F. with 0.6 M MGDA in water at pH 1.
Figure 3B:
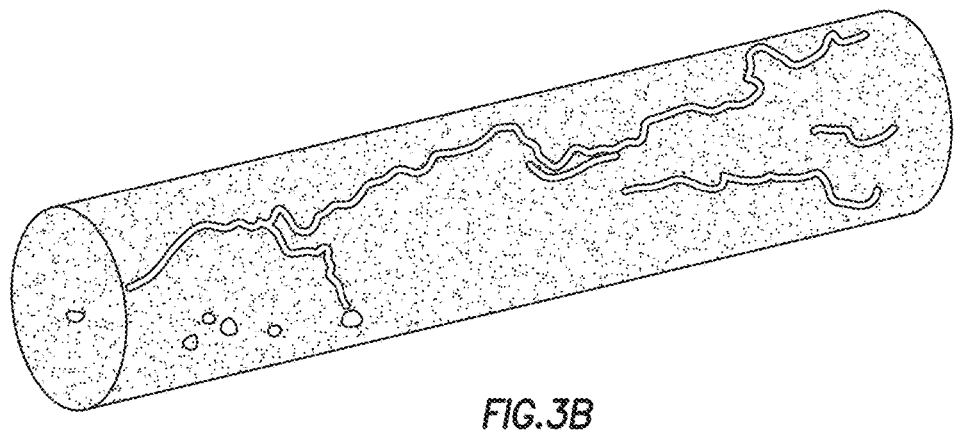
FIG. 3B shows an illustrative schematic of a calcite core having a continuous network of wormhole channels therein.

A calcite core having an initial permeability of about 75 mD (as measured with 2% aqueous KCl) was interacted at 300° F. with a treatment fluid comprising 0.6 M of the trisodium salt of MGDA in water acidified to pH 1. The treatment fluid was applied to the core sample at a flow rate of 5 mL/min. FIG. 2 shows an illustrative elution plot of a calcite core eluted at 300° F. with 0.6 M MGDA in water at pH 1. As shown in FIG. 2, treatment fluid breakthrough occurred at 1.25 pore volumes. The pH of the spent treatment fluid was 4, and the ratio of the apparent final permeability to the initial permeability was 2.5. A replicate test (elution plot not shown) did not result in a stabilized apparent final permeability, but as shown in FIGS. 3A and 3B, wormholes were generated along the length of the core sample. FIG. 3A shows a CAT scan image of an illustrative calcite core eluted at 300° F. with 0.6 M MGDA in water at pH 1. FIG. 3B shows an illustrative schematic of a calcite core having a continuous network of wormhole channels therein.

It should be noted that the final permeability values and permeability improvements referenced here are only "apparent" permeability values and are presented for the sake of comparison only. In the case of wormhole generation, there can be a preferred fluid pathway or conduit through the core sample, and Darcy's Law no longer strictly applies.

Example 3

Treatment of an Austin Chalk Core at 200° F. with 0.6 M MGDA at pH 1

Figure 4:
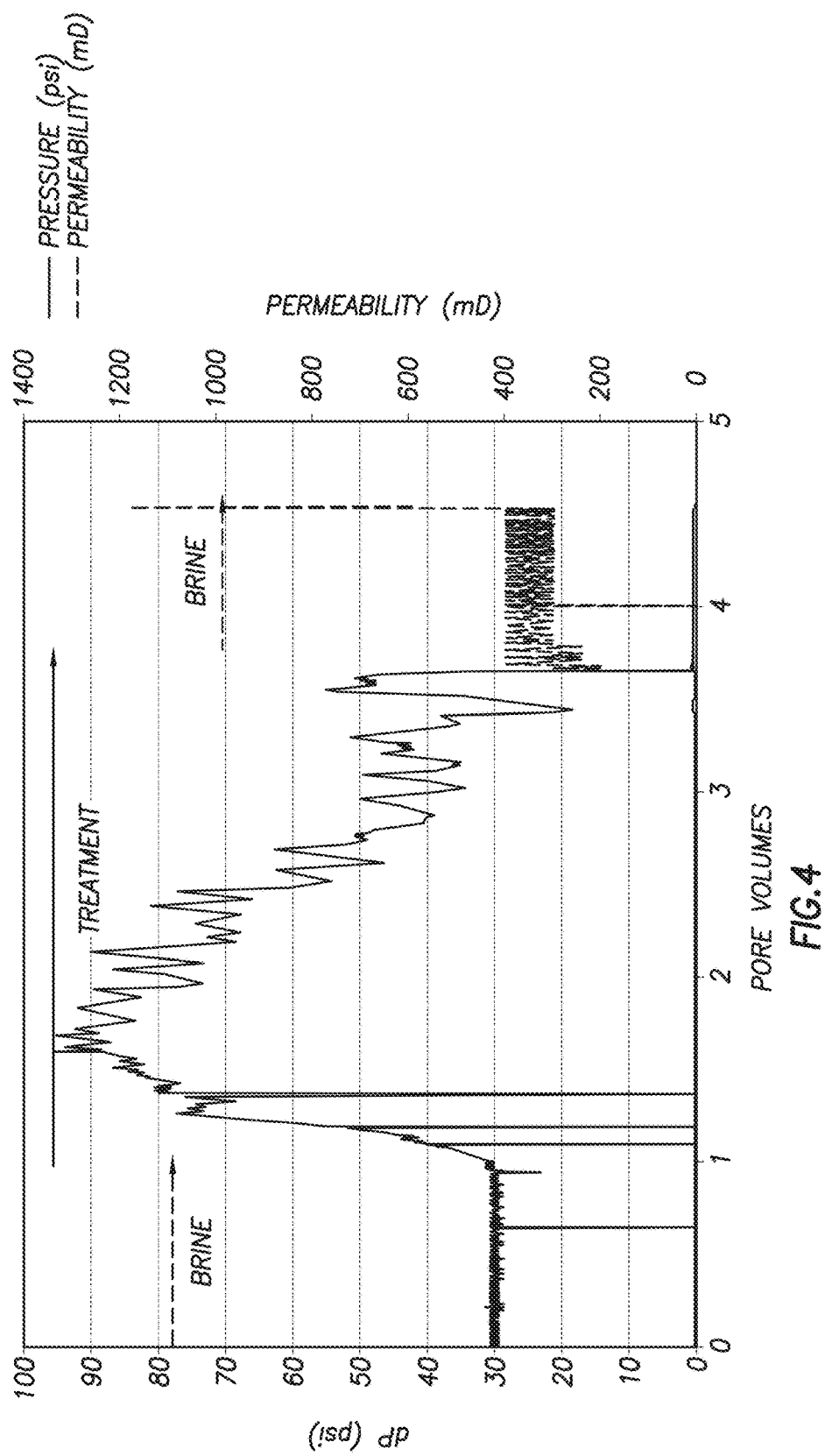
FIGS. 4-6 show illustrative elution plots of an Austin chalk core eluted at 200° F. with 0.6 M MGDA in water at pH 1 and at flow rates of 1, 5 and 10 mL/min, respectively.
Figure 5:
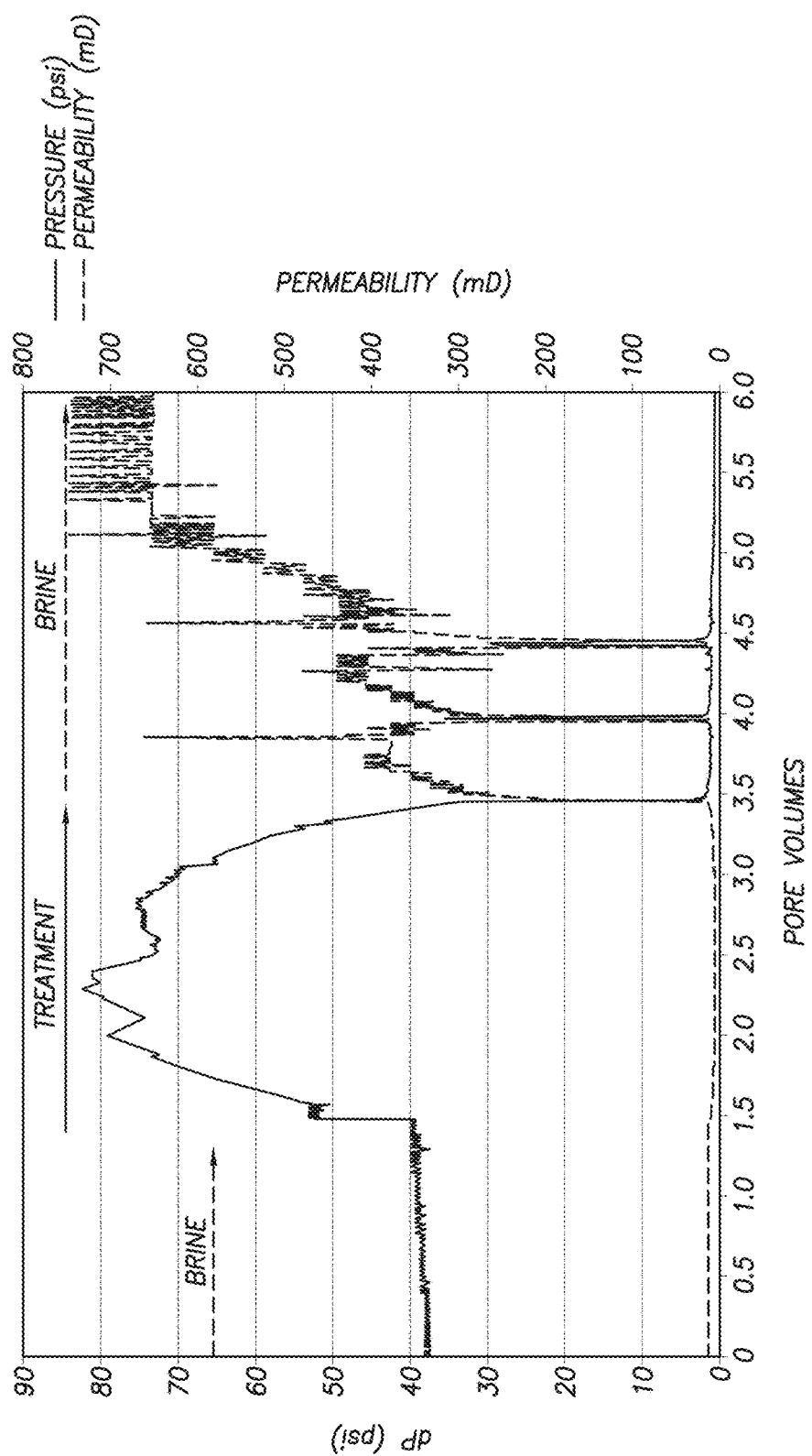
Figure 6:
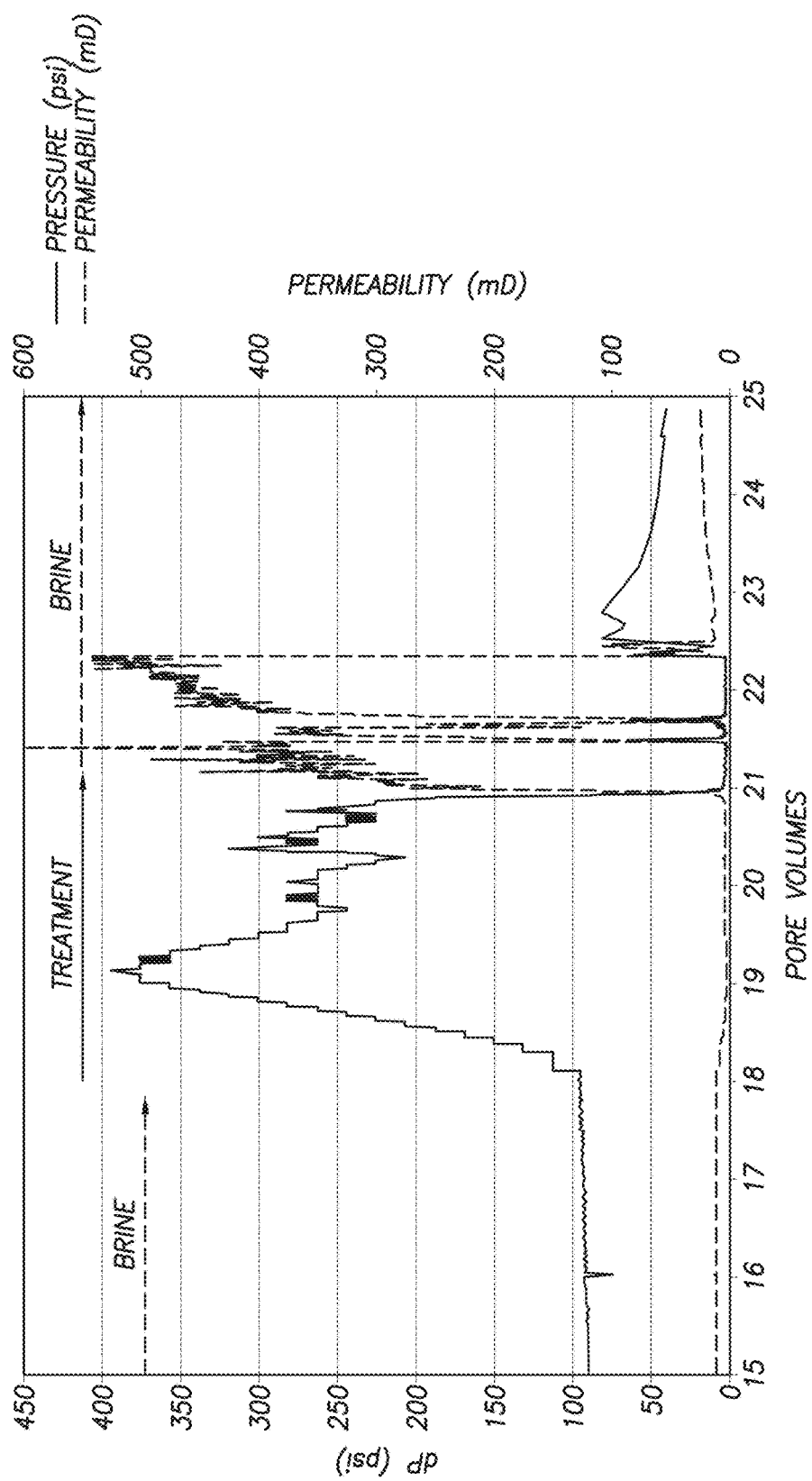

Austin chalk cores having an initial porosity of nearly 25% were interacted at 200° F. with a treatment fluid comprising 0.6 M of the trisodium salt of MGDA in water acidified to pH 1. The treatment fluid was applied to the core samples at flow rates of 1, 5 and 10 mL/min. FIGS. 4-6 show illustrative elution plots of an Austin chalk core eluted at 200° F. with 0.6 M MGDA in water at pH 1 and at flow rates of 1, 5 and 10 mL/min, respectively. As shown in FIGS. 4-6, at a flow rate of 5 mL/min, treatment fluid breakthrough reached a minimum at a flow rate of 5 mL/min (2 pore volumes to breakthrough). At the higher and lower flow rates, higher breakthrough values were seen (2.6 pore volumes to breakthrough at 1 mL/min and 3.1 pore volumes to breakthrough at 10 mL/min). The permeability increase was greatest for the 1 mL/min test, increasing by a factor of 112. At 5 mL/min, the permeability of the core increased by a factor of 27, and at 10 mL/min, the permeability of the core increased by a factor of 19. The decrease in permeability in FIG. 6 from ~500 mD at 22.5 pore volumes to a much lower value at 23 pore volumes is believed to be due to the brine flow introduced at the conclusion of the treatment phase.

Figure 7:
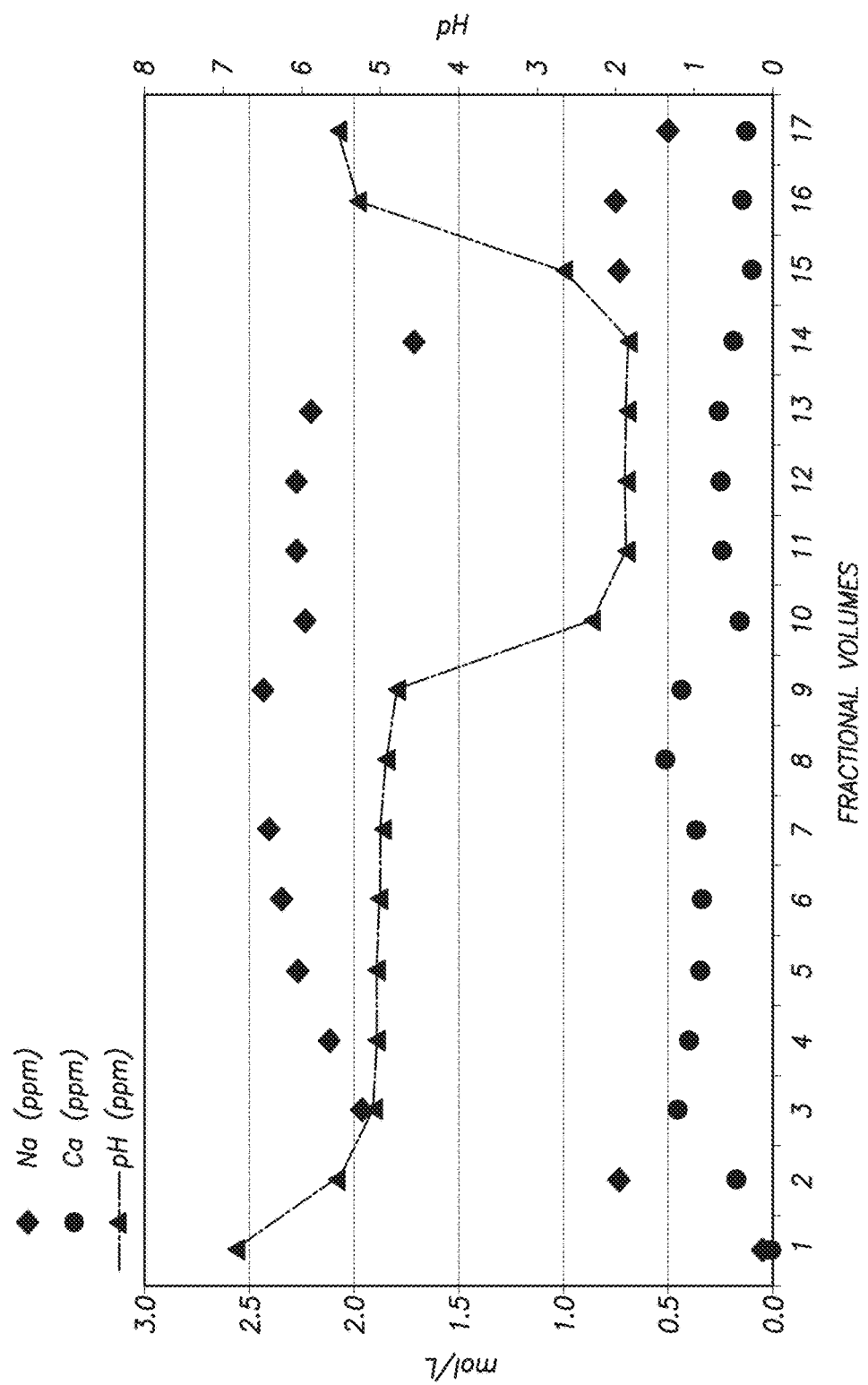
FIG. 7 shows an illustrative elution plot of the ionic profile of an Austin chalk core eluted at 200° F. with 0.6 M MGDA in water at pH 1 and at a flow rate of 10 mL/min.

For the 10 mL/min core sample, the elution profile of calcium ions, sodium ions and pH was determined. FIG. 7 shows an illustrative elution plot of the ionic profile of an Austin chalk core eluted at 200° F. with 0.6 M MGDA in water at pH 1 and a flow rate of 10 mL/min. Before breakthrough occurred, the pH of the eluent was around 5. However, after breakthrough took place, the pH dropped significantly to below 2, indicating that the treatment fluid passed through the core sample without any significant reaction taking place (e.g., through a wormhole). The pH rise seen in FIG. 7 at the end of the treatment cycle is believed to be due to a brine flush that was conducted after introduction of the treatment fluid was complete.

Example 4

Treatment of an Austin Chalk Core at 250° F. with 0.6 M MGDA at pH 1

The core flow tests of Example 3 were repeated, except that the core sample was held at 250° F., and the confining and back pressures were increased to 3000 psi and 1800 psi, respectively. The elution rate was 1 mL/min in this case. One core sample exhibited treatment fluid breakthrough at 1.4 pore volumes, and a second core sample exhibited treatment fluid breakthrough at 0.5 pore volumes. Each of these replicate samples displayed similar permeability improvements, by factors of 56 and 58, respectively.

Embodiments disclosed herein include:

A. Treatment fluids. The treatment fluids include an aqueous carrier fluid, an acid, and a chelating agent comprising an aminopolycarboxylic acid. The treatment fluid is substantially free of hydrofluoric acid or a hydrofluoric acid-generating compound. The treatment fluid has a pH at or below that at which the carboxylic acid groups of the chelating agent are substantially protonated and the chelating agent is ineffective for complexing a metal ion. The acid is selected from the group consisting of hydrochloric acid, hydrobromic acid, formic acid, acetic acid, methanesulfonic acid, and any combination thereof.

B. Methods of acidizing a subterranean formation. The methods involve providing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion; introducing the treatment fluid into a subterranean formation comprising a carbonate mineral; reacting the acid with the carbonate mineral in the presence of the chelating agent, such that the acid at least partially spends and the pH of the treatment fluid rises; and once the pH of the treatment fluid rises above a $pK_a$ value for one or more of the carboxylic acid groups, complexing a metal ion with the chelating agent.

C. Methods of acidizing a subterranean formation. The methods involve providing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion; introducing the treatment fluid into a subterranean formation comprising a carbonate mineral, the treatment fluid being introduced into the subterranean formation at a pressure greater than or equal to a fracture gradient of the subterranean formation, so as to form a fractured formation; reacting the acid with the carbonate mineral in the fractured formation, such that the acid at least partially spends and the pH of the treatment fluid rises; and once the pH of the treatment fluid rises above a $pK_a$ value for one or more of the carboxylic acid groups, complexing a metal ion with the chelating agent.

D. Systems for introducing a treatment fluid to a subterranean formation. The systems include a pump fluidly coupled to a tubular, in which the tubular contains a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion.

Embodiment A may have one or more of the following additional elements in any combination:

Element 1: wherein the treatment fluid initially contains greater than about 1% hydrochloric acid by weight.

Element 2: wherein the treatment fluid initially contains about 1% to about 10% hydrochloric acid by weight.

Element 3: wherein the chelating agent comprises an aminopolycarboxylic acid selected from the group consisting of glutamic acid diacetic acid, methylglycine diacetic acid, β-alanine diacetic acid, ethylenediaminedisuccinic acid, iminodisuccinic acid, N-tris[(1,2-dicarboxyethoxy)ethyl]amine, N-bis[2-(carboxymethoxy)ethyl]glycine, N-bis[2-(1,2-dicarboxyethoxy)ethyl]glycine, N-bis[2-(1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, any derivative thereof, and any combination thereof.

Each of embodiments B and C may be used in combination with the treatment fluid of Embodiment A.

Each of embodiments B and C may have one or more of the following additional elements in any combination:

Element 4: wherein the chelating agent comprises an aminopolycarboxylic acid selected from the group consisting of glutamic acid diacetic acid, methylglycine diacetic acid, β-alanine diacetic acid, ethylenediaminedisuccinic acid, iminodisuccinic acid, N-tris[(1,2-dicarboxyethoxy)ethyl]amine, N-bis[2-(carboxymethoxy)ethyl]glycine, N-bis[2-(1,2-dicarboxyethoxy)ethyl]glycine, N-bis[2-(1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, any derivative thereof, and any combination thereof.

Element 5: wherein the acid is selected from the group consisting of hydrochloric acid, hydrobromic acid, formic acid, acetic acid, methanesulfonic acid, and any combination thereof.

Element 6: wherein the acid comprises hydrochloric acid.

Element 7: wherein the acid comprises hydrochloric acid and the treatment fluid initially contains greater than about 1% hydrochloric acid by weight.

Element 8: wherein the carbonate mineral comprises calcite, dolomite, or any combination thereof.

Element 9: wherein the subterranean formation comprises a chalk formation.

Element 10: wherein the subterranean formation has a temperature of about 200° F. or above.

Element 11: wherein the treatment fluid is substantially free of hydrofluoric acid or a hydrofluoric acid-generating compound.

Element 12: wherein the metal ion being complexed is selected from the group consisting of a calcium ion, a magnesium ion, an iron ion, and any combination thereof.

By way of non-limiting example, exemplary combinations applicable to embodiments B and C include:

Combination 1: The method of B or C in combination with Elements 4 and 5.

Combination 2: The method of B or C in combination with Elements 4 and 6.

Combination 3: The method of B or C in combination with Elements 4 and 7.

Combination 4: The method of B or C in combination with Elements 4, 5 and 9.

Combination 5: The method of B or C in combination with Elements 4, 5 and 10.

Combination 6: The method of B or C in combination with Elements 4, 5 and 11.

Combination 7: The method of B or C in combination with Elements 4, 6 and 12.

Embodiment D may be used in combination with the treatment fluid of Embodiment A.

Embodiment D may also be used in combination with one or more of elements 4-7 and 11.

By way of non-limiting example, exemplary combinations applicable to embodiment D include:

Combination 8: The system of D in combination with Elements 4 and 5.

Combination 9: The system of D in combination with Elements 4 and 7.

Combination 10: The system of D in combination with Elements 4, 5 and 11.

Combination 11: The system of D in combination with Elements 4, 6 and 11.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    providing a treatment fluid comprising an aqueous carrier fluid, an acid, and a chelating agent comprising methylglycine diacetic acid, the treatment fluid having a pH of 1 or lower, such that the carboxylic acid groups of the chelating agent are protonated and the chelating agent is ineffective for metal ion complexation;
    introducing the treatment fluid into a subterranean formation comprising a carbonate mineral;
    reacting the acid with the carbonate mineral in the presence of the chelating agent at or below the pH at which the chelating agent is ineffective for metal ion complexation, such that the acid at least partially spends and the pH of the treatment fluid rises as the acid reacts; and
    once the pH of the treatment fluid rises above a $pK_a$ value for one or more of the carboxylic acid groups, complexing a metal ion with the chelating agent,
    wherein the chelating agent decreases a rate of dissolution of the carbonate mineral.

2. The method of claim 1, wherein the carbonate mineral comprises calcite, dolomite, or any combination thereof.

3. The method of claim 2, wherein the subterranean formation comprises a chalk formation.

4. The method of claim 1, wherein the treatment fluid is substantially free of hydrofluoric acid or a hydrofluoric acid-generating compound.

5. The method of claim 4, wherein the subterranean formation further comprises a siliceous material.

6. The method of claim 1, wherein the acid is selected from the group consisting of hydrochloric acid, hydrobromic acid, formic acid, acetic acid, methanesulfonic acid, and any combination thereof.

7. The method of claim 6, wherein the treatment fluid initially contains greater than about 1% hydrochloric acid by weight.

8. The method of claim 7, wherein the subterranean formation has a temperature of about 200° F. or above.

9. The method of claim 1, wherein the metal ion being complexed is selected from the group consisting of a calcium ion, a magnesium ion, an iron ion, and any combination thereof.

10. The method of claim 1, wherein reacting the acid with the carbonate mineral in the presence of the chelating agent comprises interacting the acid with the carbonate mineral in a manner to form one or more wormholes therein.

11. A method comprising:
    providing a treatment fluid comprising an aqueous carrier fluid, an acid, and a chelating agent comprising methylglycine diacetic acid, the treatment fluid having a pH of 1 or lower, such that the carboxylic acid groups of the chelating agent are protonated and the chelating agent is ineffective for metal ion complexation;

introducing the treatment fluid into a subterranean formation comprising a carbonate mineral, the treatment fluid being introduced into the subterranean formation at a pressure greater than or equal to a fracture gradient of the subterranean formation, so as to form a fractured formation;

reacting the acid with the carbonate mineral in the fractured formation in the presence of the chelating agent at or below the pH at which the chelating agent is ineffective for metal ion complexation, such that the acid at least partially spends and the pH of the treatment fluid rises as the acid reacts; and once the pH of the treatment fluid rises above a $pK_a$ value for one or more of the carboxylic acid groups, complexing a metal ion with the chelating agent, wherein the chelating agent decreases a rate of dissolution of the carbonate mineral.

12. The method of claim 11, wherein the carbonate mineral comprises calcite, dolomite, or any combination thereof.

13. The method of claim 12, wherein the subterranean formation comprises a chalk formation.

14. The method of claim 11, wherein the treatment fluid is substantially free of hydrofluoric acid or a hydrofluoric acid-generating compound.

15. The method of claim 14, wherein the subterranean formation further comprises a siliceous material.

16. The method of claim 11, wherein the acid is selected from the group consisting of hydrochloric acid, hydrobromic acid, formic acid, acetic acid, methanesulfonic acid, and any combination thereof.

17. The method of claim 16, wherein the treatment fluid initially contains greater than about 1% hydrochloric acid by weight.

18. The method of claim 11, wherein the metal ion being complexed is selected from the group consisting of a calcium ion, a magnesium ion, an iron ion, and any combination thereof.

* * * * *